United States Patent [19]

Nau et al.

[11] Patent Number: 5,314,120
[45] Date of Patent: May 24, 1994

[54] DEVICE FOR APPLYING PLANT-PROTECTING COMPOSITIONS

[75] Inventors: Karl L. Nau, Gross-Zimmern; Hans Raffel, Freinsheim; Heinrich David, Wölfersheim, all of Fed. Rep. of Germany

[73] Assignee: Ciba-Geigy Corporation, Ardsley, N.Y.

[21] Appl. No.: 79,696

[22] Filed: Jun. 18, 1993

Related U.S. Application Data

[63] Continuation of Ser. No. 905,140, Jun. 23, 1992, abandoned, which is a continuation of Ser. No. 810,524, Dec. 18, 1991, abandoned, which is a continuation of Ser. No. 478,602, Feb. 12, 1990, abandoned.

[30] Foreign Application Priority Data

Feb. 16, 1989 [DE] Fed. Rep. of Germany ....... 3904759

[51] Int. Cl.⁵ ................................. B05B 7/30
[52] U.S. Cl. .................................. 239/310; 239/155; 239/307
[58] Field of Search .............. 239/113, 127, 155, 307, 239/310, 317; 417/377; 137/99

[56] References Cited

U.S. PATENT DOCUMENTS

| | | | |
|---|---|---|---|
| 3,181,797 | 5/1965 | Hayes | 239/317 |
| 3,892,336 | 7/1975 | Butler | 239/310 X |
| 3,945,772 | 3/1976 | Van de Moortele | |
| 3,971,341 | 7/1976 | Bron | 417/377 X |
| 4,121,767 | 10/1978 | Jensen | 239/307 |
| 4,234,294 | 11/1980 | Jensen | 417/377 |
| 4,530,465 | 7/1985 | Gauchet et al. | 239/127 |
| 4,558,715 | 12/1985 | Walton et al. | |
| 4,678,341 | 7/1987 | Stuckey | 239/310 X |
| 4,697,739 | 10/1987 | McCracken et al. | 239/127 |
| 4,714,196 | 12/1987 | McEachern et al. | 239/127 X |
| 4,721,245 | 1/1988 | van Zweeden | 239/155 X |
| 4,790,454 | 12/1988 | Clark et al. | 239/310 X |
| 4,809,549 | 3/1989 | David | |
| 4,895,303 | 1/1990 | Freyvogel | 239/310 X |

FOREIGN PATENT DOCUMENTS

| | | | |
|---|---|---|---|
| 346109 | 2/1920 | Fed. Rep. of Germany | 239/317 |
| 2425109 | 12/1974 | Fed. Rep. of Germany | . |
| 3707186 | 9/1988 | Fed. Rep. of Germany | . |

*Primary Examiner*—Andres Kashnikow
*Assistant Examiner*—William Grant
*Attorney, Agent, or Firm*—JoAnn Villamizar; George R. Dohmann

[57] ABSTRACT

In a device for applying plant-protecting compositions and the like, having a tank for carrier fluid, for example water, and a feed pump that pumps carrier fluid from this tank through a pipe to which spray nozzles are connected, and having a metering pump that is connected by a connecting pipe to a preparation container and is driven by the carrier fluid supplied by the feed pump, in order to avoid a complicated apparatus for controlling the concentration of the preparation in the carrier fluid and to achieve reliable and accurate metering, the metering pump (5) is connected in series with the feed pump (2) so that the whole of the carrier fluid flowing through the pipe (3) passes through the metering pump (5), wherein the carrier fluid drives a drive element (12) in the metering pump (5), which in turn drives a metering mechanism (13, 14) which is connected to the connecting pipe (10) leading to the preparation container (11) and is provided with a setting sleeve (15) for the concentration of the preparation.

9 Claims, 3 Drawing Sheets

DEVICE FOR APPLYING PLANT-PROTECTING COMPOSITIONS

This application is a continuation of now abandoned application Ser. No. 07/905,140, filed Jun. 23, 1992, which is a continuation of now abandoned application Ser. No. 07/810,524 filed on Dec. 18, 1991, which is a continuation of now abandoned application Ser. No. 07/478,602 filed on Feb. 12, 1990.

BACKGROUND OF THE INVENTION

The invention relates to a device for applying plant protecting compositions and the like.

A device of this kind is known from EP-A-201 981 in which, in order to keep the concentration of the active substance in the carrier fluid constant irrespective of the driving speed of the tractor to which the device is attached, the volume of carrier fluid supplied by the feed pump to the spray nozzles is controlled, as a function of the amount of active substance added, by an electric control means that monitors one of the two fluid flows. Although the amount of active substance is controlled as a function of the driving speed, the concentration remains independent of the driving speed. The metering pump for the active substance is driven by a motor. It is said, however, also to be possible for the metering pump to be so designed that it is driven by the pressurised carrier fluid supplied by the feed pump. How, in that case, the metering pump is designed, and how the volume of carrier fluid is supposed to be controlled as a function of the amount of active substance added, is not specified. In that device, keeping the concentration of active substance in the carrier fluid constant irrespective of the driving speed necessitates a complicated control means that matches the drive of the feed pump to the amount of active substance supplied. To adjust the concentration of the active substance in the carrier fluid, the drive of the metering pump is modified by the control means, thus requiring the control means to have a further function.

AU-B-504 816 discloses a device for metering a liquid fertilizer or the like into a stream of water flowing through a main pipe, a reduction in pressure in the water flow being produced by a reduction in cross-section, for example a Venturi nozzle, in the main pipe. Pipelines are connected to the main pipe, one upstream and one downstream from this reduction in cross-section, each of which leads to a pump that is connected by way of an immersed pipe to a container housing the preparation. As a result of the higher pressure in the pipeline connected upstream from the reduction in cross-section, a diaphragm piston in the pump is acted upon, this piston, which is provided with valves and biassed by a spring, sucking fertilizer out of the container, and the fertilizer being fed into the main pipe through the pipeline connected downstream from the reduction in cross-section, in which the pressure is lower. In that device, a certain pressure difference must be produced in the main line so that the force of the spring against the diaphragm piston of the pump can be overcome and enable the pump to work. Accurate metering, as is necessary for plant-protecting compositions, cannot be achieved with that device. The adjustment of the concentration of fertilizer in the water flow has to be undertaken by modifying the pressure difference in the main pipe. The concentration cannot be adjusted accurately in this way.

Finally, DE-U-88 09 599 discloses a spraying device in the form of a hand-held spray pipe, there being mounted at the outlet end of the spray pipe a one-way supplementary fluid dispenser consisting of a cylindrical housing and a piston displaceably arranged therein on a guide tube. Primary fluid from the spray pipe flows out through this guide tube into an outlet nozzle on the supplementary fluid dispenser, whilst a partial flow of the primary fluid acts on the piston, so that the supplementary fluid contained in the supplementary fluid dispenser is forced by means of the piston into the outlet nozzle in which it is mixed with the primary fluid emerging from the guide tube. Exact metering is not possible with this device because it is not possible for the piston in the supplementary fluid dispenser to be moved from its rest position by a small amount of primary fluid. Also, because of the friction of the piston in the housing, metering cannot be predetermined and adjustment of the concentration of supplementary fluid in the primary fluid is not possible.

SUMMARY OF THE INVENTION

The problem underlying the invention is to design a device for applying plant-protecting compositions in such a manner that reliable and precise metering is possible without a complicated means for controlling the concentration of the plant-protecting composition in the carrier fluid.

This problem is solved by the features of the present invention. As a result of the series connection of feed pump and metering pump in the pipe, it is not just a partial flow but the whole of the carrier fluid flowing through the pipe that is used to drive the drive element in the metering pump, as a result of which the plant-protecting composition or preparation is reliably metered as a function of the volume of carrier fluid. A complicated means for controlling the concentration of the preparation in the carrier fluid is not necessary, because the concentration predetermined by the setting on the metering means is automatically maintained even when the throughput of carrier fluid in the pipe changes. Since the whole of the carrier fluid drives the metering means, a low throughput of carrier fluid means that a small amount of preparation is metered in, and a larger throughput of carrier fluid that a correspondingly larger amount of preparation is metered in. An adjustment of the concentration can easily be made on the metering means.

In the construction according to the invention in which the drive element driven by the carrier fluid is connected to a metering element, it is also possible to connect to the drive element of the metering pump several metering elements which are simultaneously connected to different preparation containers each by a separate connecting pipe, it being possible for the amount to be taken from each individual preparation container to be set separately and independently of the other preparation containers. Consequently, several reparation containers can be connected to the device simultaneously in a simple design.

BRIEF DESCRIPTION OF THE DRAWINGS

With reference to the drawings, arrangements of the invention are explained in detail by way of example in the following.

DETAILED DESCRIPTION OF THE INVENTION

Figure 1:
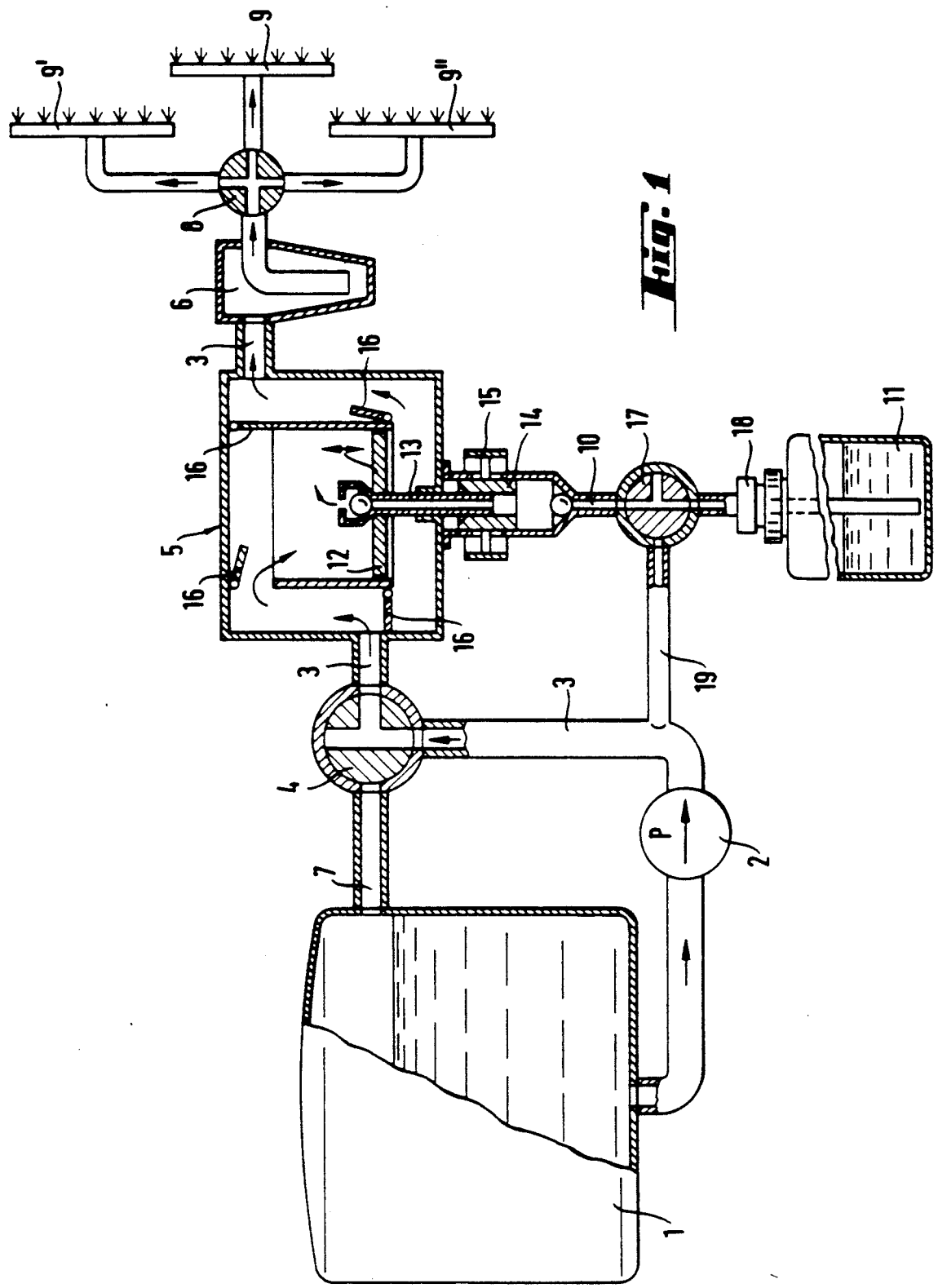
FIG. 1 is a schematic representation showing the arrangement of the essential elements of the device.
Figure 2:
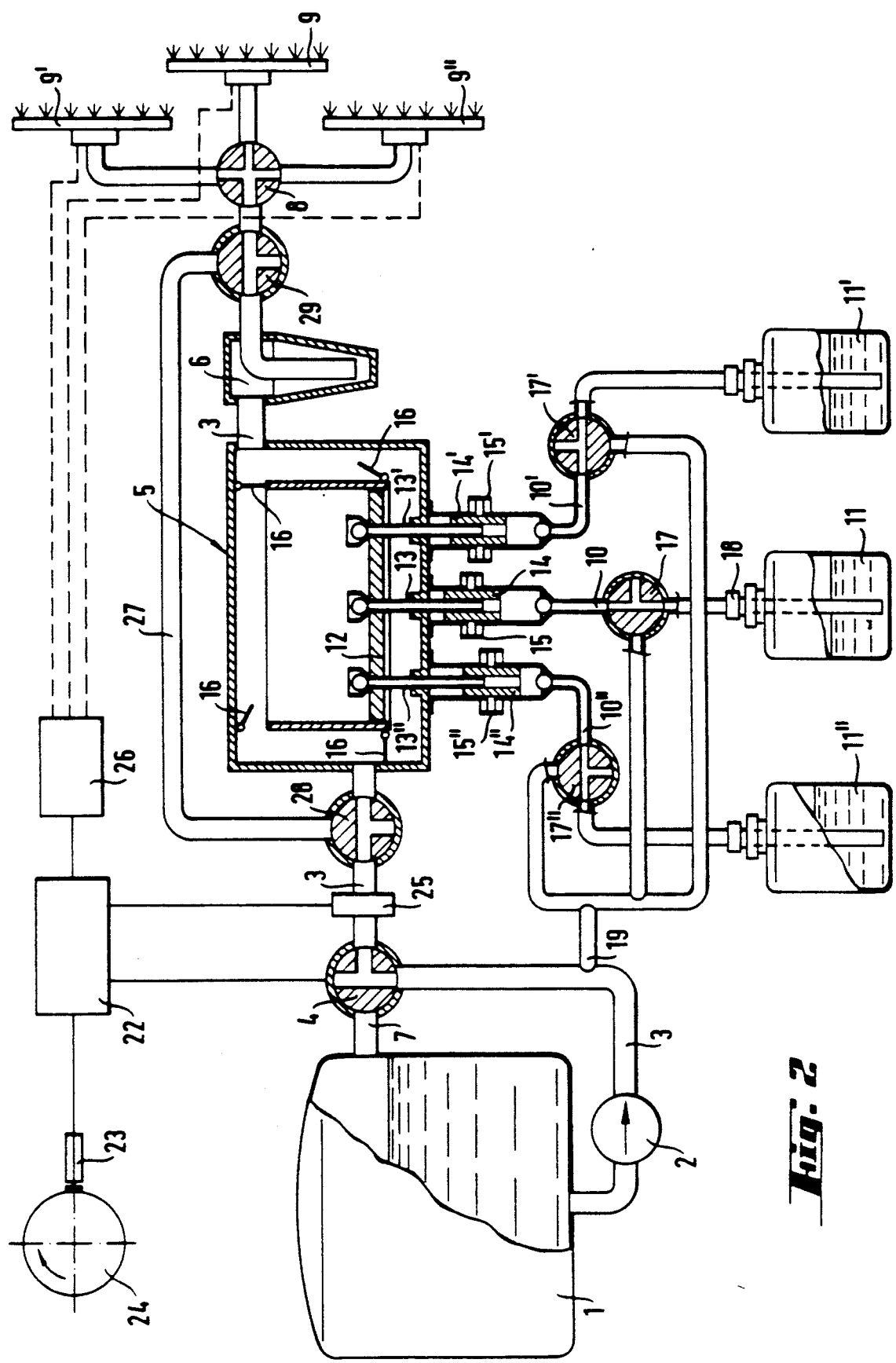
FIG. 2 is an arrangement for the simultaneous connection of several preparation containers.

In FIGS. 1 and 2, reference numeral 1 denotes a tank for carrier fluid, usually water, which may have, for example, a filling volume of approximately 500 l. A feed pump 2 feeds water from the tank 1 through a pipe 3 in which a spherical valve 4, a metering pump 5 and a mixer 6 are arranged. Reference numeral 7 denotes a return pipe between the spherical valve 4 and the tank 1. There is connected to the pipe 3 by way of a distributor 8 a spray bar having, for example, three part-width spray means 9, 9', 9'', each of which consists of a section of pipe provided with spray nozzles. The metering pump 5 is connected by way of a connecting pipe 10 to a container 11 for plant-protecting composition or preparation which may comprise a customary commercially available plastics canister with a capacity of, for example, 5 l.

The metering pump 5 sucks the plant-protecting composition, which is in liquid form, out of the preparation container 11 and adds it to the water flowing through the metering pump in such a manner that a certain amount of plant-protecting composition is added to a certain volume of water.

A metering pump 5 is provided through which there flows all of the water that is fed by the feed pump 2 through the pipe 3, and as a result of this flow of water a drive element, for example in the form of a piston 12 in the metering pump 5, is so driven that the piston 12 executes a reciprocating movement. Connected to the piston 12 is a metering device, which in the diagram is in the form of a hollow metering piston 13 provided with a return valve and displaceable in a cylinder 14. In order to set the effective sucking stroke of the metering piston 13, a setting sleeve 15 is attached to the cylinder 14 by means of which the concentration of the preparation in the carrier fluid, that is to say the amount of preparation sucked up, can be set. This metering means is connected by the connecting pipe 10 to the preparation container 11 and conveys preparation out of the preparation container through the hollow metering piston 13 into the stroke chamber of the piston 12 from which the preparation, together with the carrier fluid, passes into the pipe 3 leading to the mixer 6.

In the diagram of the metering pump 5, reference numeral 16 schematically denotes values that, as a function of the piston movement, alternately open the inlet for the carrier fluid to flow into the chamber above the piston 12 and at the same time the outlet of the chmaber below the piston, whilst the other valves are closed, and vice versa. These valves 16 are reversed by the pressurized carrier fluid and the piston movement. This volume-controlled metering pump thus operates without outside energy other than that supplied to the feed pump to feed the carrier fluid to the metering pumps.

The metering pump 5 used is preferably that described in DE- C-37 07 186 (which is equivalent to U.S. Pat. No. 4,809,549). A suitable metering means with a metering piston secured to the diaphragm piston of the metering pump in accordance with DE-C-37 07 186 is described in DE-C-24 15 109 (which is equivalent to U.S. Pat. No. 3,945,772. By means of the setting sleeve of this metering means it is possible to set, for example, an amount of from 0.05 to 10 l/ha of preparation at a water application volume of 100 to 600 l/ha, irrespective of the driving speed.

Instead of the described metering pump 5 with piston 12 and metering piston 13 attached thereto it is also possible to use a different pump construction in which a rotatably mounted drive element, for example a bucket wheel, is driven by the carrier fluid, in which the rotating bucket wheel is connected to a metering means having a rotatable metering element that sucks preparation from the container and conveys it into the flow of carrier fluid through the metering pump 5 and into the pipe 3.

To ensure thorough mixing of the preparation with the carrier fluid to which it is added, there is connected downstream from the metering pump 5 a mixer 6, which in the arrangement shown has a downwardly tapering mixing chamber with an immersed pipe projecting into the lower portion of the mixing chamber. This arrangement of a mixer operates according to the cyclone principle and ensures uniform mixing of the spray liquid. The conical shape in addition ensures that the viscosity does not influence the fluids to be mixed, so that it is also possible to use highly viscous compositions. Although a highly viscous composition can be accurately metered by the metering pump 5 a good mix cannot be obtained at the same time. This is guaranteed by the mixer 6, which can also be of a different design from that shown.

The volume of the mixing chamber is advantageously adjusted to that volume which corresponds to one stroke of the piston 12 in the metering pump 5. Preferably, the volume of the mixing chamber is equal to the reference volume displaced in the metering pump 5 with one dose.

The connecting paths between metering pump 5 and distributor 8 of the spray bars are kept as short as possible. As a result of the thorough mixing of the spray liquid in the mixer 6, it does not require any further mixing in the pipes through which the spray liquid flows. Similarly, the connecting line 10 between metering means and preparation container 11 is designed to be as short as possible so as to keep the contaminated areas of the device to a minimum.

On operation of the device attached, for example, to a tractor, the water flow to the metering pump 5 is controlled as function of the driving speed. After switching on the feed pump 2, it takes a very short start-up time of, for example, 10 to 15 seconds, to build up a constant concentration of spray liquid which can then be maintained without fluctuations. The commencement of spraying in the field can thus be very accurately controlled. As a result of the direct feeding by means of the metering pump 5, only a small portion of the spray liquid necessary for the entire spraying operation is in the device at any time. This assists in keeping the concentration of spray liquid constant.

When the spraying operation is complete the application of the spraying liquid can be terminated very quickly because there is only a small predetermined amount of spray liquid in the device between the metering pump 5 and spray nozzles on the spray bars. This amount may, for example, correspond to the amount required for the last 10 meters' driving distance to be treated. Consequently the short portions of pipe contaminated by spray liquid can be cleaned very simply. For this purpose a change-over valve 17 is provided in the connecting pipe 10 between the metering means and preparation container 11 by means of which it is possible from the driver's seat to connect the metering means by way of pipe 19 to a portion of the pipe 3 conveying water only, or to the tank 1, or to a separate water container that is not shown. Shortly before the end of the spraying operation, the metering pump 5 can be connected to the pipe 3 or the tank 1 so that the contaminated region between metering pump 5 and spray nozzles is washed with water and thus cleaned.

To connect the preparation container 11 to the connecting pipe 10, it is advantageous to provide a rapid closure, indicated by reference numeral 18 in the diagram, by means of which the container 11 can be connected quickly and simply to the device. A sealing cap provided with an immersed pipe may be provided in the container 11, to which cap the connecting pipe 10 can be directly connected by means of a rapid coupling, so that the immersed pipe remains in the container 11 permanently.

FIG. 2 shows an arrangement in which there are secured to the piston 12 of the metering pump 5, for example three metering pistons 13, 13', 13'', each of which is associated with a cylinder having a setting sleeve and is connected to a separate preparation container 11, 11', 11''. In this manner several preparation containers can be connected to a single metering pump 5 simultaneously, it being possible for the dose to be taken from each individual preparation container to be set separately at the respective setting sleeve 15.

If metering pistons 13 are mounted at opposite sides of the piston 12, then up to eight different preparation containers may simultaneously be connected by the metering pump 5, in which case eight different preparations of different dosages can be fed into the carrier fluid.

If a metering pump with a rotatable drive element is used instead of a reciprocating piston 12, then it is also possible for several metering means to be operated, for example by means of a toothed wheel that is attached to the rotatable drive element and engages with other toothed wheels on various metering means.

FIG. 2 also shows an arrangement of a computer-controlled device. Connected to a computer 22 is a revolution sensor 23 which, by way of the number of revolutions of the drive shaft 24 or of a wheel of the tractor, detects the speed and conveys this to the computer 22. A flow measuring device 25 feeds to the computer 22 signals that correspond to the rate of flow of water in the pipe 3. Also connected to the computer 22 is a control circuit 26 for the individual part-widths, which is connected by way of connecting lines (shown by broken lines) to valves (not shown) in the individual part-widths 9, 9', 9''. A further connecting line from the computer 22 leads to the spherical valve 4 for the purpose of controlling the throughput of carrier fluid or water to the metering pump. It is also possible, using the computer 22, to control the drive motor of the feed pump 2 as a function of the driving speed or some other parameter.

Before operation begins, the flow meter 25 and the revolution sensor 23 are calibrated to determine the driving distance, and the values of amount to be applied and number of part-widths or number of nozzles per part-width are fed into the computer 22. By way of the connection to the control circuit 26 the computer 22 is informed whether and which of the part-widths are connected. During the spraying operation signals relating to distance and flow in the pipe 3 are continuously fed to the computer, which compares the predetermined reference value with the actual value corresponding to the incoming signals and, when there are variations from the reference value, controls the spherical valve 4, by means of which the throughput in the pipe 3 is appropriately influenced by pressure control. In this manner the predetermined amount of water applied is monitored and adjusted to avoid an under- or over-dose as a result of variations in driving speed.

According to a further arrangement, directly following the mixer 6 it is possible to examine the concentration of the spraying liquid by means of a suitable device that feeds the ascertained concentration to the computer 22 which compares this actual value with a reference value and, where there is a difference, controls the setting sleeve 15 on the metering means accordingly so as to bring the actual value in line with the reference value.

It is also possible to provide on the metering pump a signal transmitter that monitors the operation of the metering pump 5 and, if there is an interruption in operation of the metering pump 5, gives an acoustic or optical alarm signal in the driver's cabin. Such a monitoring device can also be connected to the afore-described concentration-examining device, so that an alarm signal is given to the driver if the concentration of spray liquid differs too much from the reference value.

The change-over valve 17 is advantageously designed to be electromagnetically controllable from the driver's cabin so that it is possible to switch over to washing shortly before the end of the spraying operation.

To render possible operation of the device in a conventional manner, a bypass pipe 27 may be provided which is connected to the pipe 3 by way of change-over valves or 3-way valves 28, 29 upstream from the metering pump 5 and downstream from the mixer 6 and circumvents the metering pump 5 and the mixer 6. This bypass pipe 27 is also advantageous for using the device for applying fertilizer where metering by the metering pump 5 is not required.

Figure 3:
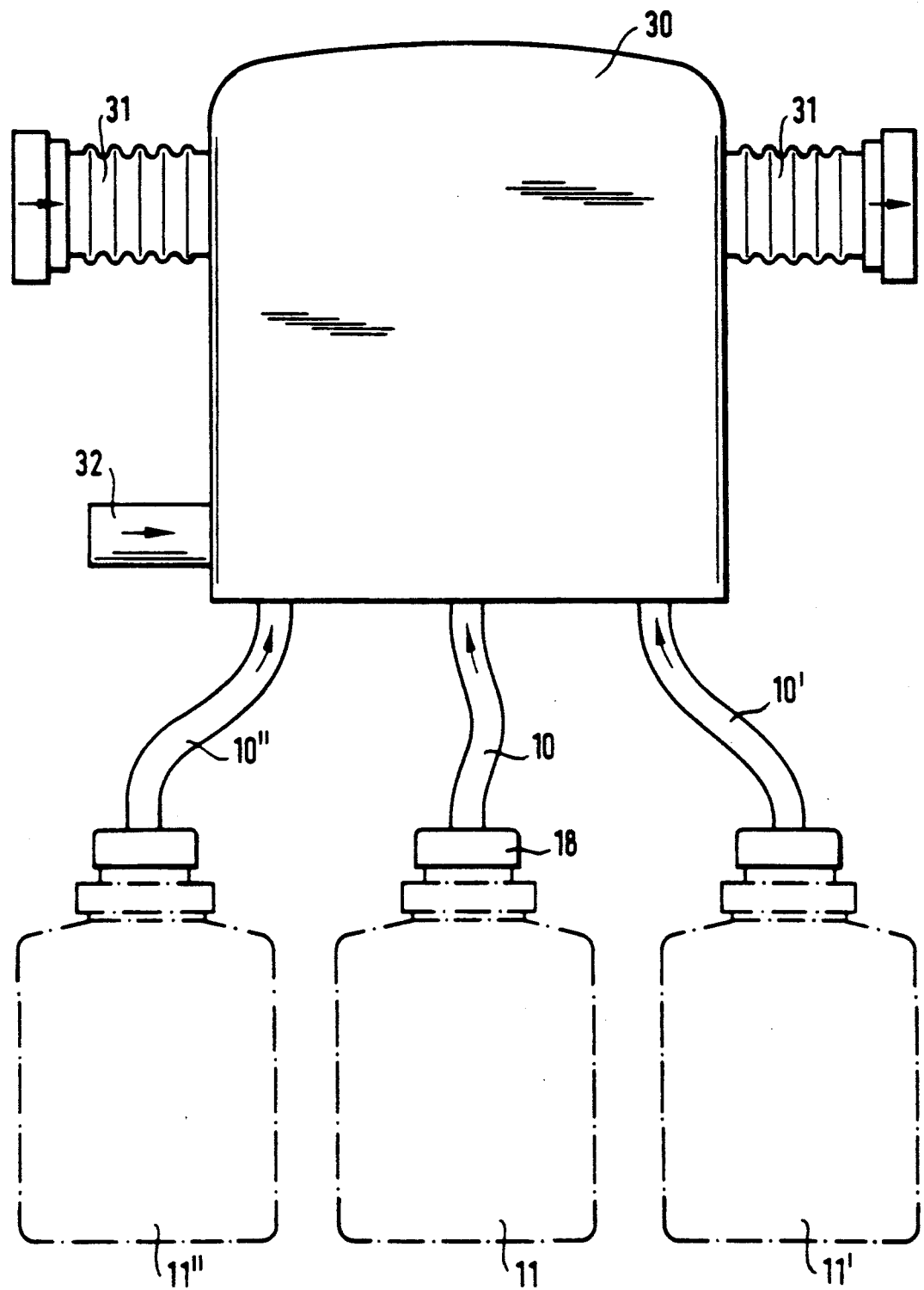
FIG. 3 is a schematic representation of a modular unit for insertion into a pipe.

Any plant-protection apparatus can be fitted with the described device. For this purpose there is advantageously provided a modular unit comprising metering pump 5 with metering means 13, 14, 15 and, if desired, the mixer 6, which is provided with corresponding connections so that the modular unit can be inserted into an existing pipe 3 of a spraying apparatus. There is advantageously integrated into this modular unit a holder for the preparation container 11 and a rapid closure for the connection thereof. In order to protect this modular unit against contamination by dust and splashes, it is preferably of encapsulated design, as indicated schematically in FIG. 3 in which the modular unit is denoted by 30. Reference numeral 31 denotes resilient tube portions that are provided for connection to the pipe 3 of a spraying apparatus and protect the modular unit 30 against vibrations during the spraying operation. A connection for the washing pipe 19 is provided at 32 on the modular unit 30, in which case it is possible for the change-over valve 17 to be integrated into the modular unit 30.

Instead of a container 11 with a liquid preparation, a container with pulverulent or granular preparation may be provided, wherein it is possible for this preparation to be prepared by admixing water in a mixing container and then for the preparation, then in paste form, to be taken from that mixing container by the metering means 13, 14, 15. In such an arrangement an agitator would have to be provided in the mixing container.

Monitoring the operation of the metering pump can also be undertaken by a switch in the connecting or suction pipe 10 of the metering pump 5. The described device can be attached not only to a tractor but also to an airplane.

What is claimed is:

1. An apparatus for applying a diluted liquid composition of predetermined concentration to a substrate, said apparatus comprising:

a tank which holds a carrier fluid;

a feed pump which pumps the carrier fluid from the tank through the apparatus;

a metering device through which all of the carrier fluid flows; and a dosing device which is connected to said metering device and to a reservoir for a concentrated liquid composition, wherein said dosing device pumps the concentrated liquid composition from the reservoir directly into the carrier fluid in said metering device to form the diluted liquid composition;

said metering device having a drive element which moves in direct proportion to the amount of the carrier fluid flowing through said metering device and being driven only by the flow of the carrier fluid through said metering device, said drive element in turn providing all of the energy required to drive said dosing device;

said dosing device being connected to the drive element in a manner such that the amount of the concentrated liquid composition pumped into the carrier fluid is directly proportional to the amount of the carrier fluid pumped through said metering device;

the drive element being a movable piston which defines a moveable barrier between a first chamber and a second chamber in said metering device, said first chamber and said second chamber each comprising an inlet valve and an outlet valve;

each of said first and second chambers having a volume which increases and decreases relative to the motion of said movable piston, such that the volume of said second chamber will decrease as the volume of said first chamber increases and vice versa;

wherein, for each of said first and second chambers, said carrier fluid enters said chamber through its respective inlet valve, which is open as its volume increases, with its respective outlet valve being closed, and exiting through its respective outlet valve, which is open as its volume decreases, with its respective inlet valve being closed, the inlet valve of said second chamber being closed when the inlet valve of said first chamber is open, and the outlet valve of said second chamber being closed when the outlet valve of said first chamber is open, and vice versa, such that one of said first and second chambers is filling while the other is emptying, with the amount of carrier fluid passing through said metering device being equal to the product of volume of said chambers and the number of pumping cycles; and, wherein said dosing device comprises a hollow metering piston with a return valve, said hollow metering piston being displaceable in a dosing chamber, wherein said hollow metering piston is connected to the drive element such that movement of the drive element results in proportional movement of said hollow metering piston, such that the dosing chamber fills with the concentrated liquid composition as said second chamber fills with the carrier fluid, and the concentrated liquid composition is pumped into said first chamber through the hollow metering piston as said first chamber fills with carrier fluid.

2. An apparatus of claim 1 wherein said dosing device comprises a setting means for adjusting the amount of concentrated liquid composition pumped into the carrier fluid with each stroke of said hollow metering piston.

3. An apparatus of claim 1 which further comprises a spray nozzle and a mixer, said mixer being positioned between said metering device and said nozzle.

4. An apparatus of claim 3 wherein said mixer is a cyclone mixer.

5. An apparatus of claim 3 which comprises a plurality of spray nozzles and a conduit which is connected to said metering device and branches into a plurality of conduit segments which connect with said spray nozzles.

6. An apparatus of claim 3 wherein said metering device and said mixer are a modular unit.

7. An apparatus of claim 1 which further comprises a plurality of reservoirs connected to said metering device by means of a plurality of valves, each of which controls the supply of concentrated liquid composition from a respective reservoir.

8. An apparatus of claim 7 wherein said dosing device comprises a setting means for adjusting the amount of concentrated liquid composition pumped into the carrier fluid with each stroke of said hollow metering piston.

9. An apparatus of claim 8 which comprises a plurality of spray nozzles and a conduit which is connected to said metering device and branches into a plurality of conduit segments which connect with said spray nozzles.

* * * * *